United States Patent [19]

Landrum, Jr.

[11] 3,863,202

[45] Jan. 28, 1975

[54] EARTH VIBRATOR TESTER

[75] Inventor: Ralph A. Landrum, Jr., Tulsa, Okla.

[73] Assignee: Amoco Production Company, Tulsa, Okla.

[22] Filed: Oct. 23, 1973

[21] Appl. No.: 408,354

[52] U.S. Cl. .... 340/17, 340/15.5 TA, 340/15.5 TC, 73/71.5
[51] Int. Cl. .................................. G01v 1/14
[58] Field of Search ....... 340/15.5 TA, 17, 15.5 TC; 73/71.6, 71.5; 331/25; 323/101, 106

[56] References Cited
UNITED STATES PATENTS

| | | | |
|---|---|---|---|
| 3,219,971 | 11/1965 | Cole | 323/101 |
| 3,386,525 | 6/1968 | Landrum et al. | 340/15.5 TA |
| 3,578,102 | 5/1971 | Ross | 340/15.5 |
| 3,698,508 | 10/1972 | Landrum, Jr. | 73/71.5 R |
| 3,761,874 | 9/1973 | Landrum, Jr. | 340/17 |
| 3,795,286 | 2/1972 | Meyer | 340/15.5 GC |

*Primary Examiner*—Maynard R. Wilbur
*Assistant Examiner*—H. A. Birmiel
*Attorney, Agent, or Firm*—Paul F. Hawley; John B. Farr

[57] ABSTRACT

In geophysical prospecting where earth vibrators are used to inject seismic wave trains into the earth, electrical and mechanical malfunctions sometimes cause the vibrators to inject signals which substantially differ from a common electrical pilot signal. When these signals differ the seismic data are distorted during the cross correlation process and where multiple vibrators are employed this difference causes a loss of synchronization so that destructive interference occurs seriously degrading the seismic information. This problem is solved by a novel test apparatus which permits routine comparison of the injected and pilot signals of each vibrator. When by use of the test displays the equipment operator observes that the injected signal produced by his vibrator differs from the pilot signal in an amount indicating faulty vibrator performance, he can take remedial action while the vibrator continues in operation or can stop his vibrator and remove it for repair.

16 Claims, 3 Drawing Figures

FIG. 1

FILTERED PILOT AND INJECTED SIGNALS

UNFILTERED PILOT AND INJECTED SIGNALS

FIG. 2

VIBRATOR TEST DISPLAYS FOR:
MARGINAL BUT ACCEPTABLE VIBRATOR OPERATION

A

UNACCEPTABLE VIBRATOR OPERATION ON VERGE OF COMPLETE PHASE-LOCK FAILURE

B

UNACCEPTABLE VIBRATOR OPERATION WITH COMPLETE PHASE-LOCK MALFUNCTION

EARTH VIBRATOR TESTER

BACKGROUND OF THE INVENTION

This invention relates to seismic prospecting using vibratory signals and more particularly to an apparatus for testing the performance of mechanical vibrators used to generate the vibratory signals.

The general method of seismic prospecting using vibratory signals is well known. Briefly stated it consists of the steps of injecting a vibratory elastic wave signal into the earth at first surface point, amplifying and reproducibly recording electrical signals generated by seismic wave detectors located at otther separated points on the earths surface in response to seismic waves arising from the reflection and refraction of the injected waves by elastic discontinuities during their transmission through the earth, cross correlating a replica of the injected vibratory signal with each of the seismic detector signals to produce a number of different trace correlation curves, and measuring the time phase relationships on these different trace correlation curves to provide the time elapsing between injection and the subsequent reflected and refracted wave arrivals from the elastic discontinuities.

The mechanical vibrator is actuated by an electrical pilot signal which is reproducibly recorded along with the signals produced by the seismic wave detectors for subsequent use in the cross correlation procedure. Using the electrical pilot signal in lieu of the injected seismic signal in the cross correlation requires that a constant phase relationship be maintained between these two signals.

To maintain this constant phase relationship, special phase control circuits have been incorporated in the electro-mechanical vibrator controller which, through feedback from an accelerometer attached to the vibrator "locks" the vibrator motion to the electrical pilot signal. The electrical and mechanical components of these phase-lock circuits have a relatively high failure rate. When the phase-locked circuit in an individual vibrator fails, the pilot signal and the injected seismic signal produced by that vibrator can vary over wide ranges. Such variance will result in seriously degraded seismic information, since the pilot rather than the injected signal is used in the subsequent cross correlation operations.

Due to the relatively low elastic wave energy produced by mechanical vibrators as well as to cancel a portion of the noise generated by their use it is customary to simultaneously utilize several vibrators deployed in a pattern on the earths surface to inject each signal. Simultaneous use of several vibrators require injected signal synchronization so that the individual injected signals will reinforce. If during any one injection cycle the vibrators are not synchronized, destructive cancellation will degrade the received signals, thereby producing noisy correlation curves on which the desired reflection signals are obscured.

Each vibrator within a miltiple vibrator pattern has its own pilot signal source which is normally a radio receiver. A prerecorded pilot signal is transmitted to all vibrators from the remote recording apparatus where it is simultaneously recorded in conjunction with the seismic detector signals for later use in the cross correlation process. Since this signal originiated from a common source the electrical pilot signals in each vibrator are essentially identical to those in each other vibrator. If the phase-lock circuits in a vibrator fail, or even differ substantially between vibrators, the requisite injected signal synchronization is destroyed and therefore the resulting seismic data is further degraded.

The present invention is a novel test apparatus which may be mounted within each individual field vibrator to routinely check the performance of the phase-lock and other vibrator controller circuits.

PRIOR ART

The method of seismic prospecting using vibratory signals is described in U.S. Pat. Nos. 2,808,577, 2,981,928 and 2,989,726 all by J. M. Crawford and W. E. N. Doty. As discussed in the above, it is essential in this type of prospecting that earth vibrators be operated at a controlled frequency in synchronism with a known pilot signal. Due to inherent limitations of the mechanical vibrating apparatus, as well as variations in the mechanical and electrical control circuits, the injected seismic signal will not be precisely synchronized with the pilot signal. This results from frequency dependent phase shift introduced not only by the vibrator unit itself, but also by the type of soil or ground upon which it is operated.

An apparatus for correcting this variable phase shift problem is shown in U.S. Pat. No. 3,208,545 by W. E. N. Doty where a phase comparator is used to produce an error signal when the injected and pilot signals differ. This error signal controls a phase shifter which adjusts the vibrator driving signal until the injected signal is phase locked with the pilot signal. A major difficulty in the Doty system results from the dissimilarity of the sinusoidal pilot signal on one hand and the relatively noisy injected signal on the other hand. The injected signal contains high amplitude harmonics generated by the vibrator itself in addition to high level noises from the vibrator machinery. Such high level noise and distortion on one of the two signals being compared prevented phase locking under many circumstances.

Cole, in U.S. Pat. No. 3,219,971, added an integrator to attenuate these detrimental injected signal noises and improved the phase-locking circuitry so that the pilot and injected signals would remain phase locked under more severe operating conditions.

In U.S. Pat. No. 3,578,102, F. W. Ross uses a base plate sensor in conjunction with a conventional phase sensor to provide one input to the phase comparator circuits.

Another improvement in phase-lock circuit design is shown in U.S. Pat. No. 3,698,508 by R. A. Landrum where a variable frequency filter is added to the Cole circuit to further extend the phase-locking capability.

Each of the prior-art improvements have been directed towad the phase-lock vibrator control circuits and the ability of the mechanical vibrator to track the predetermined pilot signal. A wide variety of such circuits are in routine use throughout the geophysical prospecting industry and there is a great need for an economical accurate method of checking their day to day performance.

While the various phase-lock circuits are capable of good performance, they are extremely prone to failure which commonly is of a gradual nature that goes unnoticed by the equipment operator.

Despite the incorporation of a phase-locking circuit into the vibrator controller, frequent changes in the mechanical vibrator characteristics and electronic circuit performance cause individual vibrators to inject seismic signals which vary when compared to the constant pilot signal.

SUMMARY OF THE INVENTION

The present invention is an apparatus for testing vibrator performance by producing graphical displays of input electrical pilot signals and output injected seismic signals for visual comparison of phase-lock circuit performance. Such test data permits earth vibrator operators and other field personnel to identify and correct any vibrator phase lock problems quickly.

Current practice involves taking periodic vibrator performance tests where all earth vibrators are brought together and their phase and amplitude responses checked by using the reproducible recording apparatus normally employed to record seismic data. Since they are made at the expense of data acquisition operations such tests are only conducted at relatively long time intervals. Typically, several days to a week may elapse between such tests. Between tests, if a vibrator phase-lock circuit fails, this failure will not normally be detected until the next test, resulting in many miles of seismic coverage which is of substandard quality. If the phase-lock circuit failure is of sufficient magnitude the entire data acquistion sequence must be repeated at great expense. The present invention circumvents this problem and provides visual test data to each vibrator operator on a continuous basis for use as often as needed. Using test graphs the vibrator operator can quickly make minor adjustments or perform minor repairs to his equipment to restablish the required phase-lock between the injected and pilot signals while field operations continue. In addition, by using a radio link between the vibrator and remote apparatus, the recorder operator can monitor vibrator performance and direct repeat vibratory signal injection cycles where vibrators have failed.

My vibrator tester is highly portable and small enough to be mounted within an individual vibrator vehicle. A single test unit can be used successively by each of a group of vibrators or preferrably a separate test unit can be permanently installed in each vibrator permitting each vibrator operator to perform comparison tests on a continuous basis while data gathering operations are in progress. The test unit contains a timing controller which is preprogrammed to provide the necessary sequence of control functions permitting simple push-button operations. A programmable ramp function generator coupled with a voltage controlled oscillator provides any range of pilot signal test frequencies while inter-connected voltage controlled filters and AGC amplifiers produce comparison signals which are easily interpreted on the output graphical displays. It is an object of this invention to provide an apparatus for maintaining optimum seismic data quality by providing operating personnel a means for conducting rapid, simple tests of individual vibrator performance so that when minor phase-lock difficulties arise they can be immediately corrected during continued field operations or when individual vibrator performance has fallen to such a level that continued operation will seriously degrade further seismic data acquisition the faulty vibrator can be removed and the field procedure immediately readjusted so that the remaining vibrators can compensate for the missing vibrator until it is repaired. It is another object of my invention to reduce the cost of routine earth vibrator testing by providing a completely self-contained test unit within each vibrator which can be periodically operated by the vibrator operator without interferring with the routine seismic data acquisition operations. Other additional advantages of the present invention will be evident from the following detailed description and drawings.

DESCRIPTION OF THE PREFERRED EMBODIMENT

Figure 1:
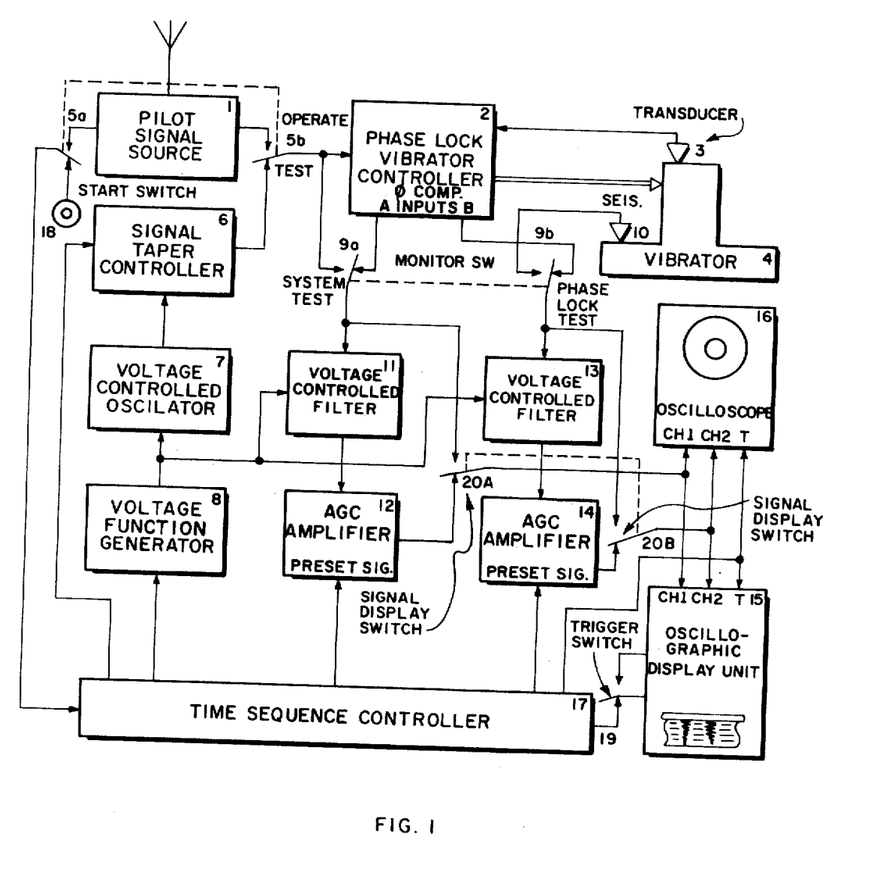
FIG. 1 is a schematic diagram of the earth vibrator testing apparatus.

FIG. 1 shows in block diagram form the elements of the present invention in conjunction with the four basic elements of an existing earth vibrator. A typical vibrator used in seismic prospecting has a pilot signal source 1, a vibrator controller 2, a transducer 3 and a mechanical vibrating mechanism 4.

Pilot signal generator 1 is usually a conventional radio receiver which produces a replica of a pilot signal originally transmitted from a remote seismic data recording unit. In some newer vibrators, identical pilot signal generator units have been added to improve pilot signal fidelity. In this type installation the signal generator in each vibrator is synchronized and triggered by receipt of a unique coded pulse sequence over the radio. In either the new or older systems, pilot signal generator 1 produces an electrical pilot signal in each vibrator vehicle which is essentially identical to the pilot signal produced in all other vibrator vehicles.

Pilot signal generator 1 is connected to phase-lock vibrator controller 2 through test operate switch 5b. This controller contains both electrical and mechanical components for actuating the mechanical vibrator mechanism 4. Included within this unit is an electrical pilot signal driver amplifier, a hydraulic power source and electrohydraulic valves for controlling the flow of hydraulic fluid to the vibrator in response to the amplified pilot signal. In addition, the controller 2 contains a special feedback circuit for insuring that the mechanical vibrator motion corresponds to the electrical pilot signal. This feedback circuit, called a phase-lock loop, includes injected signal transducer 3 attached to a driven portion of the vibrator mechanism which is in contact with the ground. Commonly, this transducer is an accelerometer permanently attached to the frame of the vibrator.

The controller 2 is hydraulically connected to vibrator 4 where a hydraulic piston causes a large baseplate in contact with the earth to inject seismic waves. The transducer 3 generates an electrical signal corresponding to the baseplate motion which is fed back to the controller 2.

The phase-lock circuits within controller 2 typically consist of two integrator circuits which respectively integrate the pilot signal and the electrical signal from transducer 3. The two integrator outputs are directed to the two inputs A and B of a phase comparator which produces an error signal proportional to the phase difference between the transducer and pilot signals. This error signal controls a phase shifter which shifts the phase of the vibrator control signal relative to the pilot signal until the transducer and pilot signals remain in a consistent phase relationship to each other. When this relationship is maintained the system is phase-locked. The two inputs A and B to the phase comparator are shown on FIG. 1 as external leads from phase-lock vibrator controller 2 to be used for system performance evaluation. If the system is properly phase-locked, these two signals will exhibit no relative phase shift. In some vibrator control systems a 0° phase shift between pilot and transducer signals is required for correct vibrator operation. Examples shown in FIGS. 2 and 3 below are from a vibrator using this type controller. Other vibrator controllers are designed to operate with a 90° rather than 0° phase shift between these two signals. Regardless of which phase shift is used in a particular controller it is necessary that this particular phase shift be maintained over all pilot signal frequencies for each of the hundreds of such signals injected during a working day.

Unfortunately, the phase-lock circuits can malfunction for a variety of reasons. When this occurs in a given vibrator, phase lock is lost and the injected seismic signal will follow the pilot signal only in a general way. Since the pilot signal rather than the injected signal is used in the subsequent cross correlation operation, any deviation between the pilot and injected signals will result in correlated seismic data of inferior quality if the deviation is small or of unusable quality where the magnitude of the deviation is large. In addition, since a plurality of vibrators are used to simultaneously inject the same pilot signal at separated locations, any deviation occurring in one vibrator can cause destructive interference resulting in a distorted composite injection signal. As discussed above, this can further degrade the seismic data.

A troublesome effect arises when the phase-lock loop in vibrator controller 2 is in a condition just verging on loss of phase lock. In this situation a hunting occurs as the controller leaves and then tries to return to the phase-lock condition. This hunting produces even greater differences between the pilot and injected seismic signals than would exist where no phase-lock system is employed.

My invention consists of the remaining elements 5–18 shown in FIG. 1. These elements produce a continuous visual display and a periodic graphical display of the vibrator phase-lock system performance. Using these displays, the vibrator operator can quickly detect any differences between the phase comparator input signals or the pilot and injected signals, either pair of which would indicate faulty phase-lock circuit performance. In addition the display produced by the oscillograph can be retained as a permanent record of vibrator operation.

Voltage controlled oscillator 7 is used to produce a local test signal which is directed through signal taper controller 6 to the input of vibrator controller 2 in lieu of the pilot signal when the operate test switch 5 is thrown to the test position. Use of a local oscillator permits performance testing with a wider frequency band signal than may be available from the pilot signal used to gather seismic data. In addition, the linear rate of change of frequency with time used for most seismic data gathering operations may be altered to permit closer examination of frequencies where the phase-lock is lost. The local test oscillator also outputs a pure, undistorted test signal which may not be available from the pilot signal generator, especially when the older noise prone radio system is employed. A typical voltage controlled oscillator useful in this application is commercially available from Wavetek Inc., P.O. Box 651, San Diego, California as Model No. 135, which is illustrated in their Catalog published February 1970.

Signal taper controller 6 is a circuit to prevent abrupt onsets and terminations of the test signals from damaging the vibrator or controller elements. If the test signals are not tapered such that the amplitude increases slowly, the mechanical vibrator will be thrown into violent motions as a result of starting and stopping transients. Such violent responses can damage the various vibrator control components, especially the injected motion transducer 3.

Signal taper controller 6 provides a smooth increase in test signal amplitude for a small fraction of a second when the test signal sequence is initiated by time sequence controller 17. Also, it provides the opposite action, linearly decreasing the test signal amplitude at the end of the test signal sequence. The duration of the signal amplitude tapering is generally short compared to the duration of the test signal. Commonly, a fixed duration taper of not less than 100 milliseconds will suffice to prevent violent vibrator responses with typical test signal lengths of from one to 30 seconds. Simple variable gain amplifier circuits having a relatively constant expansion and contraction rate and duration are well known to those skilled in the art.

Voltage control oscillator 7 outputs a signal whose frequency is controlled by voltage function generator 8. Voltage function generator 8 can be manually controlled to provide a starting voltage and hence a beginning test frequency, a duration and therefore a variable length test signal, an ending voltage and thus a final test frequency as well as a variety of voltage changes as a function of time permitting choice of how the frequency will vary from the beginning to ending frequencies. A simple voltage ramp where the voltage changes linearly with time will produce a linear swept frequency test signal. Other voltage time functions can be used if the vibrator operator wishes to examine some particular frequencies where he suspects phase lock is being lost.

Voltage function generator 8 is connected to voltage controlled oscillator 7 and to voltage control filters 11 and 13 which will be discussed below. It is controlled, in turn, by time sequence controller 17 which once triggered provides a starting pulse after a predetermined time interval to initiate the test signal generation process. Diode function generators among others are suitable for this type application as well known in the art. See "Four Step Design of Diode Function Generators" by Paul Malagari in the Aug. 2, 1963 issue of Electronics Design.

The time sequence controller 17 consists of a clock and a number of small digital counter circuits which produce switch openings and closures at predetermined intervals manually selected by adjusting external controls. Time sequence controller 17 supplies timed switching functions to preset AGC amplifiers 12 and 14 as well as to oscillographic display unit 15 in addition to signal taper controller 6 and voltage function generator 8. The time sequence controller 17 is also connected to pilot signal source 1 through operate test switch 5A so that whenever a pilot signal is received or generated locally the sequence of openings and closures will be triggered. When operate test switch 5A is in the lower test position, this same sequence is triggered by the equipment operator pushing start switch 18. Time sequencer circuits are well known to those skilled in the art and can be easily constructed from commercially available clock and counter modules. An example of such a module useful in the sequence controller are the Model No. 6220, Dual Preset control counters manufactured by Beckman, 2500 Harbor Blvd., Fullerton, California, as illustrated in their Bulletin No. 2233-A.

The combined action of time sequence controller 17, voltage function generator 8, voltage controller oscillator 7 and taper signal controller 6 produce a predetermined tapered test signal having frequencies and durations chosen by the operator.

To check the performance of the overall vibrator system to this predetermined test signal, it is necessary to compare the pilot and injected signals. If these signals exhibit no or a very small phase shift from that designed into the controller operation can be considered acceptable.

Figure 2:
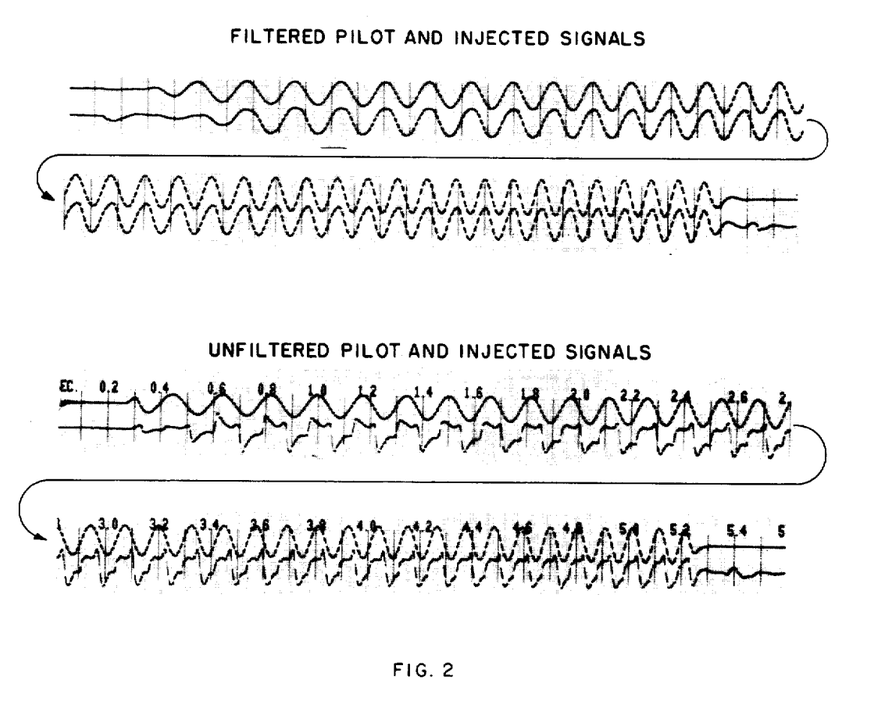
FIG. 2 illustrates typical test signals useful in understanding the present invention.

Direct visual monitoring of these two signals will often produce no useful information. The first two traces shown on FIG. 2 illustrate the difficulty. While the pilot signal input is sinusoidal in nature, the signal from transducer 10 is highly distorted by harmonics. This harmonic distortion and associated noise is created by the mechanical vibrator components and the effect of the earth upon which the vibrator is operating. Simple high-cut filtering cannot eliminate this distortion since the second harmonic of the lowest frequency falls within the band of the original pilot signal. For example, assuming a 5 to 100 Hz test signal; the 5 Hz portion of the test signal will produce harmonics at 10, 15, 20 . . . Hz; the 10 Hz portion will produce 20, 30, 40 . . . Hz harmonics and so on up to the 50 Hz portion of the swept frequency signal. These harmonics combine with the fundamental test signal frequencies making their attenuation impossible on an overall signal basis. To attenuate the strong harmonics to a level where visual comparison is possible, two voltage controlled filters 11 and 13 are employed to pass only the instantaneous frequency corresponding to the one being generated by voltage controlled oscillator 7. The voltage control filters have a narrow bandpass of only a few hertz centered on the instantaneous frequency being generated by oscillator 7. Voltage function generator 8 supplies the same control voltage to each filter 11 and 13, and the voltage controlled oscillator 7, to insure only the fundamental of the test signal will be passed by the two filters.

While only one such filter is required to eliminate the harmonics from the transducer signal, two identical filters are employed to insure that any phase shifts introduced in the filtering process are the same on the two signals which are to be compared.

The transducer 10 is preferably a special velocity-responsive seismometer constructed to withstand the severe jolts and large amplitude motions encountered on the vibrator baseplate. This seismometer is permanently attached to the baseplate and generates an electrical signal corresponding to the seismic signal injected into the earth. It is used to afford a check on the operation of feedback transducer 3 and the associated integrator circuit in vibrator controller 2.

AGC amplifiers 12 and 14 are respectively connected to voltage control filters 11 and 13. The amplifiers which can be preset to a predetermined gain level by an external signal from time sequence controller 17 are used to smooth out amplitude variations in the filtered injected seismic signal. Again, as with the voltage control filters, two essentially identical units are employed to insure no serious phase shifts will be introduced to interfere with the signal comparisons. The automatic gain control circuits in each amplifier are set so that their characteristics are essentially identical.

The pilot signal output by AGC amplifier 12 is directed through signal display switch 20A to one of the deflection circuits in oscilloscope 16 and to one of the two signal inputs of oscillographic display unit 15. The injected signal output by AGC amplifier 14 is fed through signal display switch 20B to the remaining deflection circuit on the oscilloscope 16 and to the second input channel of the oscillographic display unit 15.

Oscilloscope 16 provides a continuous display of the two signals. Where X and Y inputs are used, a lissajous pattern will be produced which can indicate slight phase shifts between the two signals. Voltage function generator 8 or an internal time base generator can also be used in oscilloscope 16 to provide X axis deflection voltages and a two-channel electronic switch employed to display both inputs in a conventional side by side wave form display. In lieu of oscilloscope 16, a phase meter could be employed to provide a continuous indication of system performance.

For more detailed system analysis, particularly where permanent records are needed to show the effects of equipment changes as a function of time, a camera mounted on the oscilloscope could be employed. However, the typical 3 × 4 aspect ratio available on a typical oscilloscope screen is not optimal for this type of analysis. Instead, it has been found to be more economical and more accurate to use a simple two-channel oscillographic display unit 15. The long paper records produced by such a unit permit detailed examination of the two signals at each of a number of different frequencies despite the relatively long duration of the test pilot signals. The oscillographic display unit 15 is only used periodically when the equipment operator has detected a malfunction on oscilloscope 16. When trigger switch 19 is in the lower position, it is activated by time sequence controller 17, a small fraction of a second before the pilot signal sequence is initiated. The upper position of trigger switch 19 is used to manually start the oscillographic display unit where partial records are desired by the equipment operator. Ten millisecond timing lines are also generated by time sequence controller 17 which may be superimposed on the two signal traces for aid in phase distortion analysis. The second pair of traces shown in FIG. 2 illustrate an output record from oscillographic display unit 15 when a correctly operating vibrator is tested. The action of the voltage control ufilters and AGC amplifiers permit a visual comparison which shows the phase lock circuits to be operating correctly in this particular vibrator. The upper two traces in FIG. 2 illustrate the near impossibility of visually making a meaningful phase comparison in the presence of the severe harmonics on a typical injected signal where no filtering is employed.

When no input signal is present, AGC amplifiers 12 and 14 operate at maximum gain, thereby producing a large amplitude transient when the first portion of the test signal is received. To prevent this, a preset signal is supplied by time sequence controller 17 to reduce the gain of these amplifiers to a predetermined value for a time interval sufficiently long to ensure the test signal has taken control of the automatic gain control loop.

The two signals compared are the pilot and injected signals when switch 9 is in the left or system test position. Where a phase shift is noted, it is desirable to more accurately pinpoint its origin. It may occur within the phase comparator shifter circuits or can be caused by a faulty accelerometer and associated integrator circuits. By throwing switch 9 to the right or phase-lock test position, the two signals being input to the phase comparator are displayed. If these two signals are in phase, the system trouble is localized to the phase comparator or phase shifter circuits, while if they differ in the same manner as the pilot and injected signals, the accelerometer or integrator circuits would be suspect.

The displays produced on oscilloscope 16 and oscillograph 15 are those produced by the voltage controlled oscillator 7 as long as operate-test switch 5 remains in the test position. Each test cycle is initiated by the vibrator operator pushing start switch 18 which causes a time sequence controller 17 to begin its timing cycle.

Pilot signal monitoring can be performed during the actual signal injection procedure when switch 5 is in the operate position. Reception by pilot signal source 1 of the remotely transmitted pilot signal or synchronization code will trigger time sequence controller 17 thereby initiating a test cycle. Prior to beginning routine operation, voltage function generator 8 is manually set to produce a voltage ramp coinciding with the pilot signal in routine use in the particular prospect area. When so adjusted, voltage function generator 8 will cause voltage control filters 11 and 13 to pass the instantaneous frequency of the pilot signal produced by pilot signal source 1. A preset voltage corresponding to the initial frequency is used to initilize these filters. Voltage function generator 8 also causes voltage controlled oscillator 7 to generate a replica of the pilot signal being used at this particular prospect location. However, this signal is not connected to the input of phase-lock vibrator controller 2. When monitoring in the operate mode, the filtered signals will be displayed on oscilloscope 16 so the operator can monitor his own vibrator performance. If trigger switch 19, which is a normally center-off switch, is in the lower position, a paper oscillograph record will be produced for the entire pilot signal in response to the signal produced by time sequence controller 17. By momentarily moving switch 19 to the upper position, a paper record can be made of any portion of the pilot signal that the operator desires.

On occasion, it is useful to note the severity of harmonic distortion present on the injected signal. For this purpose, signal display switch 20 may be moved from the normally closed lower position to the upper position which bypasses the voltage contol filters and AGC amplifiers, permitting the unfiltered pilot and injected signals to be displayed on oscilloscope 16 or on the record produced by oscillographic display unit 15. This mode of signal display is particularly useful when switch 9 is in the phase lock test position since integration and whatever type of filtering that is incorporated within the vibrator controller has already been applied and the presence of severe harmonic distortion adversely affects the phase comparator operation. If a four channel oscillograph is available, switch 20 may be eliminated and the four signals displayed simultaneously on the same record.

By manual adjustment of voltage function generator 8, operator test switch 5, system phase lock test switch 9, and trigger switch 19, a wide variety of vibrator tests can be performed by the vibrator operator without the necessity of interrupting the seismic data gathering operations, as has heretofore been required. By watching either lissajous or wave form displays on oscilloscope 16, the operator can monitor his own unit's operation as seismic data is being gathered. If from the oscilloscope display he detects a phase shaft indicative of a vibrator malfunction, a paper oscillographic record can be produced immediately to confirm the type of malfunction and where it may be occurring. By switching from the operate to the test mode, a more diagnostic test signal will allow him to make corrective adjustments in the phase lock vibrator controller circuits or to stop his particular vibrator until repairs can be effected.

Figure 3:
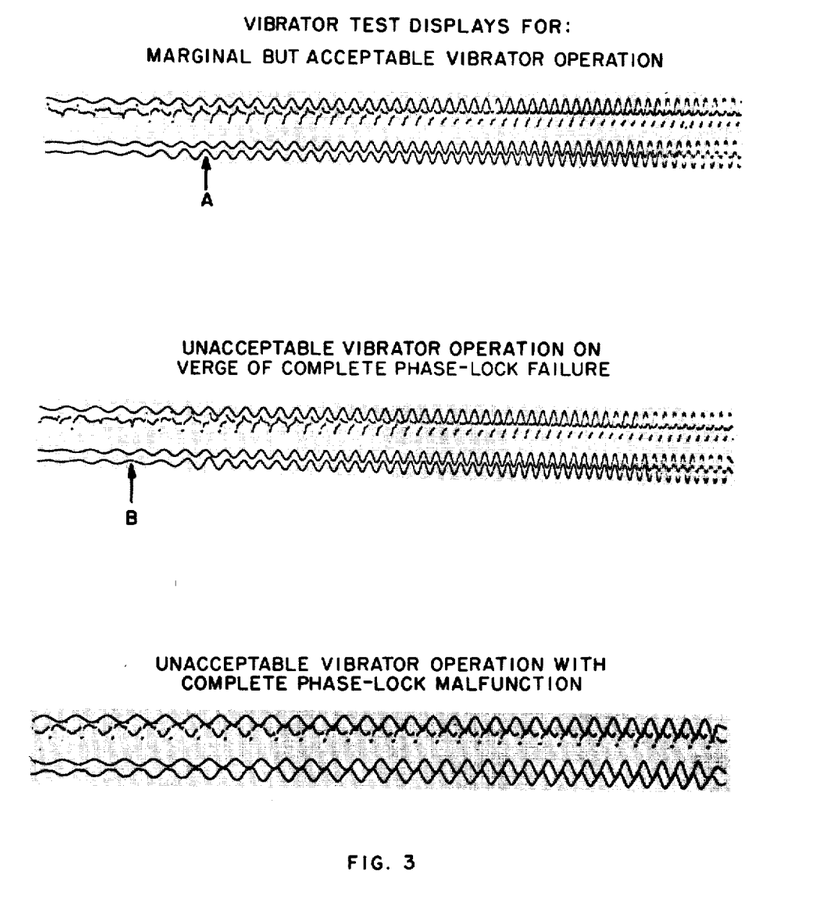
FIG. 3 shows test signals produced by vibrators with successively increasing degrees of phase-lock failure.

FIG. 3 shows three sets of oscillographic recordings from 1) a vibrator in marginal but acceptable operating condition, 2) a vibrator in unacceptable operating condition where the controller phase lock circuits have failed at the lower pilot signal frequencies and 3) a vibrator where the phase lock circuits are seriously malfunctioning resulting in the entire injected signal being out-of-phase with the pilot signal. The bottom two traces on each recording are typical of the displays produced by my invention when the signal display switch 20 is in the lower position, that is after the voltage control filtering action has taken place. The upper two traces in each recording are the signals as they appear prior to the filtering when the signal display switch 20 is in the upper position, illustrating the problem of attempting to analyze phase-lock performance when the transducer signals are not filtered to remove harmonic distortion.

On the upper test recording in FIG. 3, the two filter traces show the phase lock is maintained over most of the signal. At the low frequency end, indicated by the letter "A," some phase shift of less than 90° can be seen. While this is not desirable and is not typical of a correctly operating vibrator using a 0° controller as seen by comparison with the display shown in FIG. 2, it would represent the upper limit of a phase error which might be considered acceptable.

The middle test recording on FIG. 3 shows how a gradual failure of the phase lock circuitry appears on the test records. While the higher frequency portion of the signal remains phase locked, the low frequency portion has shifted from the less than 90° out-of-phase shown in the first test recording to 180° out-of-phase at the very lowest frequency of the test pilot signal, indicated by the letter "B." This increasing phase shift at low frequencies indicates vibrator trouble and the vibrator operator should take immediate remedial action. By use of my invention, this situation can be detected as it progresses. When the operator notes shifts approaching 90°, as in the first recording, adjustments are made to the vibrator control circuitry to prevent further degradation to the situation shown in the middle recording.

The bottom recording shows a complete loss of phase lock control in a seriously malfunctioning vibrator. Even in this severe situation without my test apparatus, the operator would have no way of knowing that his particular vibrator was not operating correctly. Continued use of this vibrator would seriously degrade the repetition of many seismic data and could require the repetition of many miles of survey line. Each of the three recordings shown in FIG. 3 were taken in the same immediate area and from the same vibrator within a period of one operating day. Using existing vibrator checking procedures, this malfunction in all likelihood would not have been detected for several more days.

While the invention has been described in detail as applied to phase locking hydraulic vibrators, it is equally applicable to other types of vibrators with or without phase lock loops where harmonic distortion present on the injected signals effectively prevents a meaningful visual comparison with the pilot signal.

I claim:

1. A method for evaluating the performance of an earth vibrator used to inject seismic signals into the earth substantially corresponding to a predetermined pilot signal which comprises:
   a. generating a predetermined varying frequency test signal chosen to evaluate the performance of said earth vibrator over the range of frequencies used in seismic prospecting;
   b. actuating said vibrator with said test signal in lieu of said pilot signal such that seismic signals are injected into the earth in correspondence with said test signal;
   c. producing a base plate transducer signal corresponding to said injected seismic signal;
   d. filtering said base plate transducer signal to attenuate harmonics and noise produced by said vibrator during said seismic signal injection process;
   e. filtering said test signal in a manner essentially identical to that used in step (d) above for the purpose of introducing substantially the same phase shift in said test and base plate signals; and
   f. displaying said filtered test and base plate signals whereby an operator of said earth vibrator can monitor his vibrator's performance by observing the phase relationship between said test and base plate signals.

2. A method as recited in claim 1 further comprising the steps of:
   a. amplifying said filtered base plate signal using a first automatic gain control amplifier such that the amplitude of said filtered base plate signal remains substantially constant over the duration of said test signal;
   b. amplifying said filtered test signal with a second automatic gain control amplifier for the purpose of introducing phase shifts and amplitude changes in said filtered test signal which are essentially identical to those introduced in said base plate signal in step (a) above.

3. A method as recited in claim 2 further comprising the step of presetting said first and second automatic gain control amplifiers to a predetermined fixed gain for a period of time beginning at the inception of said test signal cycle and lasting until said test and base plate signals have effectively achieved control of said automatic gain control circuits.

4. A method as recited in claim 1 where said generating step is accomplished by varying the output frequency of a voltage controlled oscillator in correspondence with a voltage control signal having a manually selectable initial voltage, final voltage, duration, and voltage change as a function of time between said initial and final voltages.

5. A method as recited in claim 4 where said base plate and test signal filtering steps are accomplished using essentially identical voltage responsive filtering circuits controlled by said voltage control signal such that at any interval of time during the test signal duration the center pass-band frequency of said base plate signal filter and said test signal filter coincide with the frequency of the test signal generated by said voltage controlled oscillator.

6. A method as recited in claim 1 further comprising the step of tapering the amplitude of said predetermined frequency test signal such that said test signal amplitude increases from 0 to maximum value over a time interval of from 10 to 500 milliseconds after the inception of said test signal and decreases from maximum to 0 amplitude over a time interval of from 10 to 500 milliseconds prior to the termination of said test signal.

7. An individual earth vibrator testing method as recited in claim 1 where said displaying step is accomplished by reproducing said test and base plate signals on the face of an oscilloscope in a manner such that the time varying phase differences between said signals may be viewed by said earth vibrator operator in real time as said test signals are being injected into the earth.

8. An individual earth vibrator testing method as recited in claim 1 further comprising the step of plotting an oscillographic paper record having said base plate and test signals in close proximity such that phase differences between said test and base plate signals can be measured as a function of signal duration and frequency to permit said vibrator operator to determine the effect of equipment adjustments and repairs.

9. In seismic prospecting system having at least one mechanical earth vibrator for injecting a seismic signal into the earth, an electrical pilot signal generator at each earth vibrator location for producing a common predetermined electrical pilot signal, a first injected signal transducer rigidly attached to each mechanical earth vibrator for producing a first electrical signal corresponding to said seismic signal injected into the earth by said vibrator and a vibrator controller connected to said pilot signal generator, said mechanical vibrator and said first transducer for actuating said vibrator in substantial coincidence with said pilot signal, said vibrator controller containing a phase comparator circuit having a first input connected to said first transducer through a first filtering and integration network and a second input connected to said pilot signal generator through a second filtering and integration network and an output connected to a phase shifter for the purpose of maintaining a consistent phase relationship between said pilot and said first transducer signals by shifting the phase of said pilot signal before actuating said mechanical vibrator; an individual vibrator system testing apparatus comprising:

a. a means for generating a predetermined variable frequency test signal switchably connected to said vibrator controller input such that said test signal may be directed to said vibrator controller in lieu of said pilot signal when desired by an operator of said individual vibrator;

b. a second transducer located in close proximity to said mechanical earth vibrator for providing a second electrical signal corresponding to said injected seismic signal;

c. a first filtering means switchably connected to said second transducer for attenuating harmonics and noise present on said second electrical signal;

d. a second filtering means switchably connected to said test signal generating means, said second filtering means having essentially identical phase transfer characteristics as said first filtering means such that substantially the same phase shifts are introduced in said test signal as are introduced in said second electrical signal by said first filtering means; and e. display means switchably connected to the input and output of said first and second filtering means for providing a visual display to said individual vibrator operator of the phase relationship between said test and second electrical signals before and after filtering, thereby permitting said operator to monitor the performance of his individual vibrator.

10. An individual earth vibrator test apparatus as recited in claim 9 further comprising:

a. a first switch means connected between said first filter means, said second transducer and said first phase comparator input for the purpose of permitting said vibrator operator to observe on said display said first transducer signal after integration and filtering accomplished within said vibrator controller prior to input to said phase comparator in lieu of second transducer signal when said first switch means is activated; and b. a second switch means connected between said second filtering means, said test signal generating means and said second phase comparator input for the purpose of permitting said vibrator operator to observe on said display said test signal input to said phase comparator after integration and filtering accomplished within said vibrator controller in lieu of said test signal directly from said test signal generating means.

11. An individual earth vibrator testing apparatus as recited in claim 9 where said variable frequency test signal generation means comprises:

a. means for producing a variable voltage control signal having a manually selectable initial voltage, duration, final voltage, and voltage change as a function of time over said duration between said initial and final voltages; and b. a voltage controlled oscillator means connected to said means for producing said variable frequency test signal such that the frequency of said test signal corresponds to the voltage of said control signal.

12. An individual earth vibrator testing apparatus as recited in claim 11 where said first filtering means comprises a voltage controlled filter connected to said variable voltage control signal producing means such that the center frequency of the pass band of said filter corresponds to said voltage controlled signal in essentially the same manner as said voltage controlled oscillator means thereby passing with substantially no attenuation the instantaneous frequency of said second transducer signal corresponding to the same instantaneous frequency of said test signal, the band width of said pass band being chosen such that harmonics of any test signal frequency are attenuated.

13. An individual earth vibrator testing apparatus as recited in claim 11 where said second filtering means comprises a voltage controlled filter connected to said variable voltage control signal producing means such that the phase shift produced by said second filtering means is essentially identical to the phase shift produced by said first filtering means at each voltage controlled frequency thereby phase shifting said test signals substantially the same amount at each frequency as the phase shift introduced in said second transducer signal by said first filtering means.

14. An individual earth vibrator testing apparatus as recited in claim 9 where said displaying means comprises:

a. an oscilloscope connected to said test and transducer signal filtering means having a two-channel electronic switch and internal time base generator for displaying said test and transducer wave forms side-by-side mounted so said vibrator operator can observe phase differences between said test and transducer signals as a function of time; and b. an oscillographic display means connected to said test and transducer signal filter means for intermittently producing a paper record with said test and transducer signals plotted in such a form that phase variations can be detected by said vibrator operator as a function of test frequency signal and duration.

15. An individual vibrator testing apparatus as recited in claim 14 further comprising:

a. a first automatic gain control means connected between said first filtering means and said display means for the purpose of maintaining substantially constant amplitude on said second transducer signal; and b. a second automatic gain control means connected between said second filtering means and said display means for the purpose of introducing essentially identical phase shifts in said variable frequency test signal as introduced by said first automatic gain control means in said second transducer signal in step (a) above.

16. An individual vibrator testing apparatus as recited in claim 15 further comprising a time sequence controller connected to said variable frequency generating means, said oscillographic display means and said first and second automatic gain control means for providing a predetermined time sequence of switching functions following an initiation pulse produced by said vibrator operator, said time sequence controller providing a switch closure to initiate said variable frequency test signal generation, a switch closure of a predetermined duration chosen to produce an oscillographic record of duration long enough to encompass said variable frequency test signal duration, switch closures of sufficient duration to apply a preset signal to said first and second AGC amplifiers for the purpose of maintaining a fixed output display signal level during the period before said test and second transducer signals can effectively control gain of said amplifiers.

* * * * *